US011151360B2

(12) United States Patent
Ge et al.

(10) Patent No.: US 11,151,360 B2
(45) Date of Patent: Oct. 19, 2021

(54) FACIAL ATTRIBUTE RECOGNITION METHOD, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Yanhao Ge, Shenzhen (CN); Jilin Li, Shenzhen (CN); Chengjie Wang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 83 days.

(21) Appl. No.: 16/665,060

(22) Filed: Oct. 28, 2019

(65) Prior Publication Data

US 2020/0057883 A1  Feb. 20, 2020

Related U.S. Application Data

(63) Continuation of application No. PCT/CN2018/117013, filed on Nov. 22, 2018.

(30) Foreign Application Priority Data

Nov. 28, 2017  (CN) .......................... 201711214467.6

(51) Int. Cl.
*G06K 9/00* (2006.01)
*G06K 9/62* (2006.01)

(52) U.S. Cl.
CPC ..... *G06K 9/00281* (2013.01); *G06K 9/00248* (2013.01); *G06K 9/6256* (2013.01); *G06K 2009/00322* (2013.01)

(58) Field of Classification Search
CPC ........... G06K 9/00288; G06K 9/00302; G06K 9/00308; G06K 9/00248; G06K 9/00268;
(Continued)

(56) References Cited

U.S. PATENT DOCUMENTS

| | | | | |
|---|---|---|---|---|
| 8,971,589 B2 * | 3/2015 | Kato | ............... | G06K 9/00281 382/115 |
| 2011/0091113 A1 * | 4/2011 | Ito | .................. | G06K 9/00315 382/197 |

(Continued)

FOREIGN PATENT DOCUMENTS

| | | |
|---|---|---|
| CN | 101706872 A | 5/2010 |
| CN | 103258186 A | 8/2013 |

(Continued)

OTHER PUBLICATIONS

International Search Report for PCT/CN2018/117013 dated Feb. 22, 2019 [PCT/ISA/210].

*Primary Examiner* — Quan M Hua
(74) *Attorney, Agent, or Firm* — Sughrue Mion, PLLC

(57) ABSTRACT

A face attribute recognition method, electronic device, and storage medium. The method may include obtaining a face image, inputting the face image into an attribute recognition model, performing a forward calculation on the face image using the attribute recognition model to obtain a plurality of attribute values according to different types of attributes, and outputting the plurality of attribute values, the plurality of attribute values indicating recognition results of a plurality of attributes of the face image. The attribute recognition model may be obtained through training based on a plurality of sample face images, a plurality of sample attribute recognition results of the plurality of sample face images, and the different types of attributes.

20 Claims, 8 Drawing Sheets

(58) Field of Classification Search
CPC .. G06K 9/00281; G06K 9/00315; G06K 9/00; G06K 9/38; G06K 9/00221; G06K 9/00664; G06K 2009/00322; G06K 9/00255; G06K 9/0061; G06K 9/00845; G06K 9/00906; G06K 9/2027; G06K 9/4628; G06K 9/6206; G06K 9/00362; G06K 9/00892; G06K 9/6255; G06K 9/6267; G06K 9/6293; G06T 7/0012; G06T 2207/10016; G06T 2207/20084; G06T 2207/30201; G06T 7/73; G06T 3/0093
See application file for complete search history.

(56) References Cited

U.S. PATENT DOCUMENTS

| | | | | |
|---|---|---|---|---|
| 2012/0140982 A1* | 6/2012 | Sukegawa | ............ | G06K 9/6255 |
| | | | | 382/103 |
| 2015/0085327 A1* | 3/2015 | Kostyukov | ............ | H04N 1/409 |
| | | | | 358/451 |
| 2017/0249502 A1* | 8/2017 | Xiong | ................ | G06K 9/00275 |

FOREIGN PATENT DOCUMENTS

| | | | |
|---|---|---|---|
| CN | 103824053 | A | 5/2014 |
| CN | 104143079 | A | 11/2014 |
| CN | 106203395 | A | 12/2016 |
| CN | 107844781 | A | 3/2018 |

* cited by examiner

FACIAL ATTRIBUTE RECOGNITION METHOD, ELECTRONIC DEVICE, AND STORAGE MEDIUM

CROSS-REFERENCE TO RELATED APPLICATIONS

This application is a continuation of International Patent Application No. PCT/CN2018/117013 filed on Nov. 22, 2018, which claims priority from Chinese Patent Application No. 201711214467.6, entitled "FACE ATTRIBUTE RECOGNITION METHOD AND APPARATUS, ELECTRONIC DEVICE, AND STORAGE MEDIUM," and filed in the Chinese Patent Office on Nov. 28, 2017, which are incorporated herein by reference in their entireties.

BACKGROUND

1. Field

Embodiments of the disclosure relate to the field of mode recognition technologies, and in particular, to a face attribute recognition method, an electronic device, and a storage medium.

2. Description of Related Art

With development of a mode recognition technology, a face recognition technology has been widely applied to various fields. To provide more targeted service, face attributes in an image may further be recognized. A face attribute recognition method is a process in which face attributes in a given input image are determined by using the mode recognition technology according to the image. The face attributes may include age, gender, expression, hair style, wearing glasses, and the like.

The current face attribute recognition method performs face detection on an image to obtain a coordinate frame of a face, then performs face registration on a face image in the coordinate frame to perform normalization processing, and input the normalized face image into an attribute recognition model. The attribute recognition model may extract features from the normalized face image, and classify face attributes based on the extracted features to obtain a plurality of face attributes to implement a face attribute recognition process.

SUMMARY

Embodiments of the disclosure provide a face attribute recognition method, an electronic device, and a storage medium, to solve a problem of low face attribute recognition precision in the related art.

According to an embodiment, there is provided a face attribute recognition method, performed by an electronic device. The method may include obtaining a face image, inputting the face image into an attribute recognition model, performing a forward calculation on the face image using the attribute recognition model to obtain a plurality of attribute values according to different types of attributes, and outputting the plurality of attribute values, the plurality of attribute values indicating recognition results of a plurality of attributes of the face image. The attribute recognition model may be obtained through training based on a plurality of sample face images, a plurality of sample attribute recognition results of the plurality of sample face images, and the different types of attributes.

According to another embodiment, there is provided an electronic device including at least one memory configured to store computer program code; at least one processor configured to access the computer program code and operate as instructed the computer program code. The computer program code may include obtaining code configured to cause the at least one processor to obtain a face image, input and output code configured to cause the at least one processor to: input the face image into an attribute recognition model, perform a forward calculation on the face image using the attribute recognition model to obtain a plurality of attribute values according to different types of attributes, and output the plurality of attribute values of the face image, the plurality of attribute values indicating recognition results of a plurality of attributes of the face image. The attribute recognition model may be obtained through training based on a plurality of sample face images, a plurality of sample attribute recognition results of the plurality of sample face images, and the different types of attributes.

According to another embodiment, there is provided a non-transitory computer-readable storage medium, storing executable instructions. The executable instructions are capable of causing a computer to obtain face image; input the face image into an attribute recognition model; perform a forward calculation on the face image using the attribute recognition model to obtain a plurality of attribute values according to different types of attributes; and output the plurality of attribute values, the plurality of attribute values indicating recognition results of a plurality of attributes of the face image. The attribute recognition model is obtained through training based on a plurality of sample face images, a plurality of sample attribute recognition results of the plurality of sample face images, and the different types of attributes.

In the embodiments of this application, an electronic device performs face detection, face registration, normalization processing, and the like on an obtained image, and then inputs the processed image into an attribute recognition model. The attribute recognition model performs face attribute recognition on the processed image. In addition, in a recognition process, different processing manners may be used for the attribute recognition model according to different types of attributes. That is, situations in which the attributes are a continuous variable and a qualitative variable may be considered, and recognition precision of the continuous variable in the face attribute recognition may be improved.

BRIEF DESCRIPTION OF THE DRAWINGS

To describe the technical solutions in the embodiments of the disclosure more clearly, the following describes the embodiments with reference to accompanying drawings. Apparently, the accompanying drawings in the following description show merely some embodiments of the disclosure, and a person of ordinary skill in the art may still derive other embodiments from the disclosure without creative efforts.

DESCRIPTION OF EMBODIMENTS

To make objectives, technical solutions, and advantages of the disclosure clearer, the following describes implementations of the disclosure with reference to the accompanying drawings.

Figure 1:
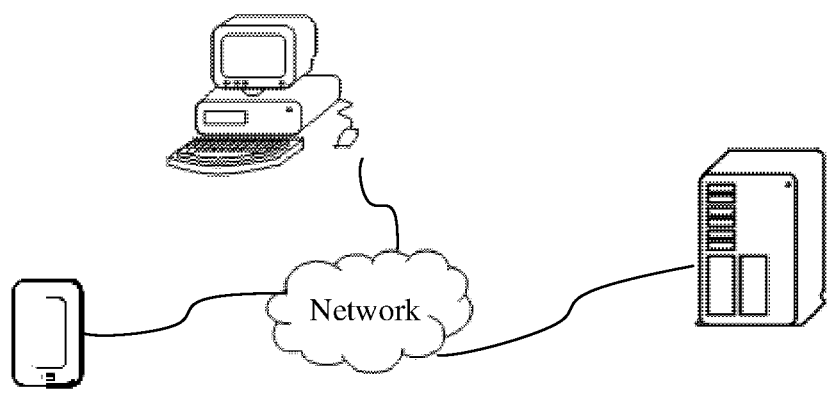
FIG. 1 is a schematic diagram of a face recognition system according to an embodiment.

FIG. 1 is a schematic diagram of a face recognition system according to an embodiment. As shown in FIG. 1, the face recognition system may include a terminal and a server. The terminal and the server may be connected through a network, and may exchange data. The terminal may be used as an image acquisition device, and may acquire an image and convert the acquired image into a computer readable form. The terminal may alternatively be a recognition device, and perform face recognition on an image acquired by the terminal to obtain effective information of the image. The server may also be used as a recognition device and perform face recognition on an image acquired by the terminal. The server may further provide a targeted service based on a recognition result. For example, the server may perform identity authentication, payment, access control management, and the like through face recognition.

The face recognition system may include a face acquisition and tracking function, a face modeling and retrieval function, an in-person discrimination function, and an image quality detection function. The face recognition system may further recognize face attributes of a face image. The face attributes may include age, gender, expression, hair style, wearing glasses, and the like. According to embodiments shown in FIGS. 2-4, the following describes a face attribute recognition method and an attribute recognition model training method.

Figure 2:
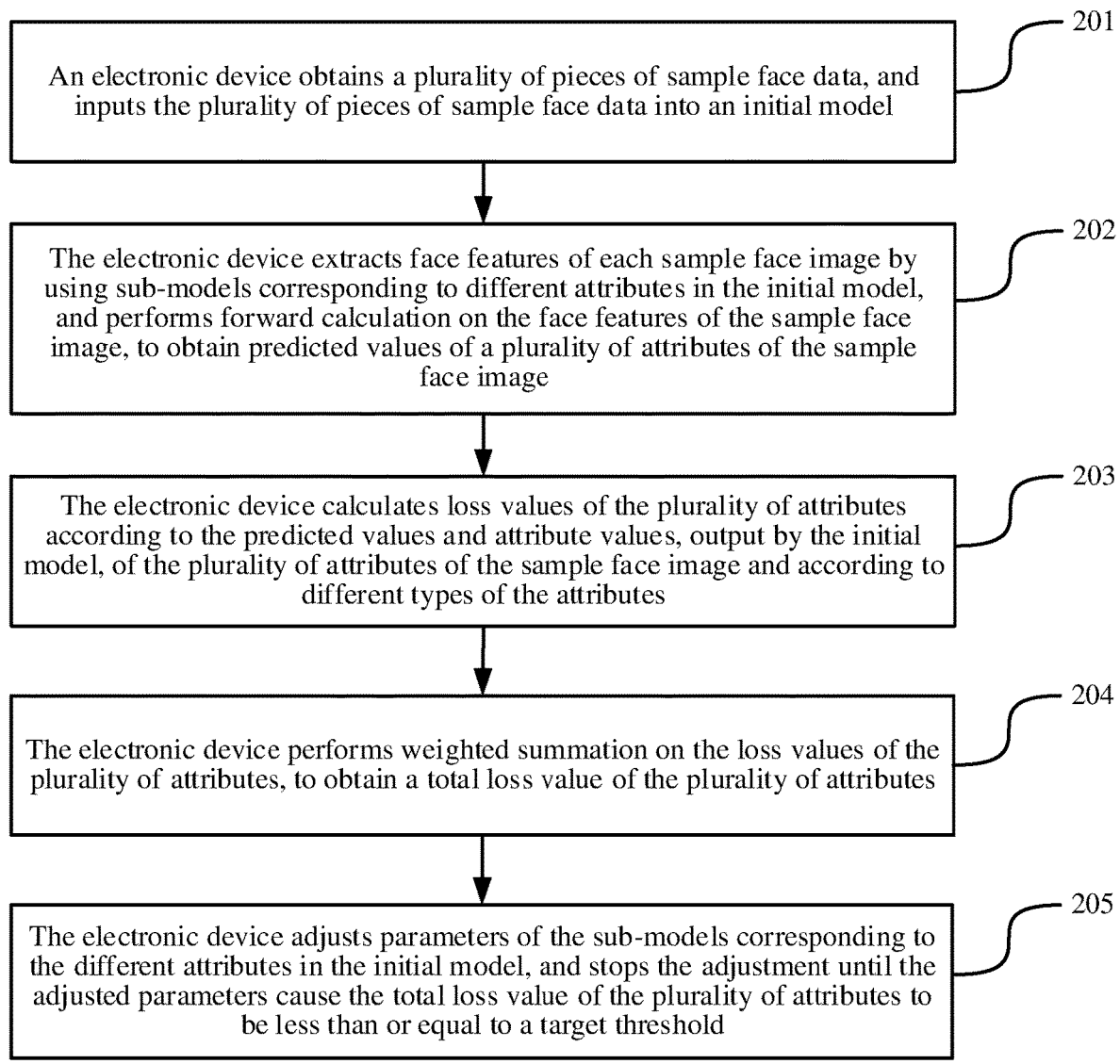
FIG. 2 is a flowchart of an attribute recognition model training method according to an embodiment.

FIG. 2 is a flowchart of an attribute recognition model training method according to an embodiment. The attribute recognition model training method may be applied to an electronic device. The electronic device may be provided as a server or a terminal. The embodiments are not limited hereto. Referring to FIG. 2, the method may include the following steps.

In step 201, the method may include obtaining a plurality of pieces of sample face data, and inputting the plurality of pieces of sample face data into an initial model.

The plurality of pieces of sample face data may include a plurality of sample face images and attribute values corresponding to a plurality of attributes of each sample face image. The plurality of attributes of the face image may be classified into different types. When the attribute is a continuous variable, the attribute of this type may be referred to as a regression attribute, for example, age. In a case that the attribute is a qualitative variable, the attribute is not a regression attribute, for example, gender. The qualitative variable may reflect an attribute feature of a phenomenon, but may not specifically indicate a value of a quantity. That is, the qualitative variable has only a classification feature rather than a quantity feature.

Because the types of the attributes are different, attribute values used for indicating the attributes may also have different representation forms. The attribute values of the attributes may be in a numeric form, or may be in a vector form.

For example, the plurality of attributes may be age, gender, and expression. In the plurality of attributes, the age is a regression attribute, and the gender and the expression are not regression attributes. Specifically, the numeric form may be used to represent the attributes. For example, there are two types of genders, 0 may be used to represent a male, and 1 may be used to represent a female. There may be six types of expressions: happiness, sadness, fear, anger, surprise, and hate. The six types of expressions may be numbered 0, 1, 2, 3, 4, and 5, respectively. For example, attributes of a face image in the plurality of sample face images may be represented as 20, 1, and 0. That is, the attributes of an age, gender, and facial expression, respectively, of a 20 year old female with a happy face. As another example, attributes of a face may be represented as 30, 0 and 3. That is, attributes of an image showing a 30 year old male with an angry face. Attribute values of a plurality of attributes of the two face images may be 20, 1, and 0, and 30, 0, and 3. After the electronic device obtains the two pieces of sample face data to reduce model calculation difficulty, normalization processing may be respectively performed on the attribute values of the plurality of attributes of the face images in the two pieces of sample face data, to obtain attribute values in a numeric form and attribute values in a vector form. A value range of the attribute values may be [0, 1]. The age is a regression attribute, and may be represented in a numeric form. The gender and the expression are not regression attributes, and may be represented in a vector form. The attribute values of the plurality of attributes of the foregoing two face images may be converted into 0.2, (0, 1), and (1, 0, 0, 0, 0, 0), and 0.3, (1, 0), and (0, 0, 0, 1, 0, 0). Alternatively, the attribute values corresponding to the plurality of attributes in the sample face data may be attribute values obtained after normalization processing. The embodiments described above are not limited hereto.

The electronic device may obtain a plurality of pieces of sample face data from a face database, and train a model based on the plurality of pieces of sample face data, to obtain an attribute recognition model. The face database may include a large quantity of face images and attribute values of a plurality of attributes of each face image, or the face database may include a large quantity of face images, and the electronic device may label attribute values for the large quantity of face images. After obtaining the plurality of pieces of sample face data, the electronic device may input the plurality of pieces of sample face data into the initial model, and start a training model.

The initial model may include a plurality of sub-models. Each sub-model may be used for recognizing one of a plurality of attributes. A quantity of sub-models that may be initialized may be determined according to a quantity of attributes that need to be recognized. Alternatively, a quantity of the sub-models in the initial model may be greater than a quantity of the attributes. However, the embodiments described above are not limited hereto.

In step 202, the method may include extracting face features of each sample face image by using sub-models corresponding to different attributes in the initial model, and performing forward calculation on the face features of the sample face image to obtain predicted values of a plurality of attributes of the sample face image.

If different attributes need to be recognized for the sub-models corresponding to the different attributes in the initial model, different face features need to be extracted. For example, to recognize a hair style attribute, only a face contour and location coordinates of hair need to be extracted. The electronic device may extract the face features corresponding to the corresponding attributes of each sample face image by using the sub-models corresponding to the different attributes in the initial model, and perform forward calculation on the face features to obtain the predicted values of the plurality of attributes of the sample face image.

In the sub-models corresponding to the different attributes in the initial model, an initial parameter may be set. For any one of the plurality of sub-models, the sub-model may use the parameter and an extracted feature to perform forward calculation, and output a calculated predicted value of an attribute corresponding to the sub-model.

According to an embodiment, a process of the forward calculation may be performed by the initial model based on a convolutional neural network (CNN) model. In each sub-model in the initial model, multi-layer calculation may be included in a face feature calculation process, where an upper layer calculates an input feature, and an obtained output is used as an input to a next layer, and so on. Accordingly, the forward calculation may obtain an output of the last layer, and the predicted value of the attribute corresponding to each sub-model based on the last layer of output.

In another embodiment, in the foregoing multi-layer calculation process, each layer may first calculate a product of an input and a weighted value, and then calculate a sum value of the product and a bias value. The sum value is used as an output, and the output may be also used as an input to a next layer. The foregoing multi-layer calculation is only described as an example. The calculation process may further include convolutional calculation.

The foregoing process in which the predicted value of the attribute corresponding to each sub-model is obtained based on the last layer of output, which may be different according to different types of attributes. Here, the different types of attributes may be prestored in a storage and may be updated based on the recognitions results of the attribute recognition model.

In a case that an attribute corresponding to a sub-model is a regression attribute, the last layer of output is a predicted value of the attribute corresponding to the sub-model.

In a case that an attribute corresponding to a sub-model is not a regression attribute, normalized calculation is performed on the last layer of output by using a SoftMax function to obtain a prediction vector of the attribute corresponding to the sub-model, where each digit in a predicted value in the prediction vector corresponds to a recognition result, and a value range of the predicted value calculated by using the SoftMax function is [0, 1], and may also be used to represent a probability of the recognition result. The SoftMax function may be used to analyze a plurality of recognition results of the attribute, and perform normalization processing on a final recognition result, so that accuracy of the final recognition result can be effectively improved.

The SoftMax function may be represented as:

$$\sigma(z)_j = \frac{e^{z_j}}{\sum_{h=1}^{d} e^{z_h}},$$

where j represents an identifier of a recognition result of an attribute, d represents a quantity of recognition results of attributes, h represents an identifier of a recognition result of an attribute in a summation process, z represents an output calculated by using the attribute recognition model, and σ represents a predicted value of an attribute, and a value range is [0, 1].

In step 203, the method may include calculating loss values of the plurality of attributes according to the predicted values and attribute values, and outputting by the initial model of the plurality of attributes of the sample face image according to different types of the attributes.

An objective of training the attribute recognition model is to enable the attribute recognition model to recognize a face image to obtain attribute values of the face image. Therefore, the attribute recognition model needs to be trained, so that predicted values and the attribute values that are obtained by calculating the face image by using the attribute recognition model are equal or substantially equal. Specifically, differences between the predicted values of the plurality of attributes and the attribute values of the corresponding attributes that are output by the initial model need to be calculated. The differences are loss values. Subsequently, parameters in the initial model may be adjusted, so that the loss values decrease, to achieve the objective of training the attribute recognition model.

The electronic device may calculate the loss values of the plurality of attributes according to the predicted values and the attribute values of the plurality of attributes of each sample face image. In the calculation process, a loss value corresponding to each attribute may be calculated by using a loss function. The plurality of attributes may have different types. During calculation of the loss values of the plurality of attributes, the loss value corresponding to the attribute may also be calculated according to a different type of the attribute and by using a different loss function. Specifically, during calculation of loss values of a plurality of attributes according to different types of attributes, the following manner may be implemented. For each of the plurality of attributes, in a case that the attribute is a regression attribute, calculating a predicted value and an attribute value of the attribute by using a first target function, to obtain a loss value corresponding to the attribute, where the first target function is used for calculating a loss value of a continuous variable; or in a case that the attribute is not a regression attribute, calculating a prediction vector and an attribute vector of the attribute by using a second target function, to obtain a loss value corresponding to the attribute, where the second target function is used for calculating a loss value of a qualitative variable.

According to an embodiment, the first target function and the second target function may be selected according to different types of attributes. The following describes the two target functions by using specific examples.

The first target function may be a Euclidean loss function:

$$L_k = \frac{1}{2} \sum_{j=1}^{i} (y_1^1 - x_1^1)^2,$$

where k represents a number of a current attribute in a plurality of attributes, and is used for identifying the attribute, $y_j^k$ represents a predicted value calculated by using the attribute recognition model, $x_j^k$ represents an attribute value of the attribute, represents a regression dimension, j represents an identifier of the regression dimension, and L represents a loss value corresponding to the attribute.

For example, the attribute recognition model may need to be trained to recognize three attributes. The three attributes may be age, gender, and expression. The three attributes are numbered 1, 2, and 3 respectively. The age is a regression attribute, and a loss value of an age attribute may be calculated by using the first target function. The number of the age attribute is 1, and k=1. In addition, the age is a one-dimensional variable, so during calculation of a loss value $L_1$ of the age attribute, i=1, and a formula is as follows:

$$L_1 = \tfrac{1}{2}(y_1^1 - x_1^1)^2, \text{ where}$$

$y_1^1$ is an attribute value of the age attribute of the current face image, $x_1^1$ is a predicted value calculated by using the attribute recognition model of the age attribute of the current face image. For example, if the attribute value of the age attribute of the current face image is 0.2, but an attribute value calculated by using the attribute recognition model of the age attribute of the current face image is 0.3, the loss value $L_1$ of the age attribute of the face image is 0.005.

The second target function may be a cross entropy loss function:

$$L_k(x,z) = \Sigma_{h=1}^d x_h \log(z_h) + (1-z_h), \text{ where}$$

k represents a number of a current attribute in a plurality of attributes, and is used for identifying the attribute, x represents an attribute value of the attribute, z represents a predicted value calculated by using the attribute recognition model, d represents a quantity of recognition results of the current attribute, h represents an identifier of a recognition result of the current attribute, and L represents a loss value corresponding to the attribute.

For example, the gender is a qualitative variable, and the second target function may be used to calculate a loss value of a gender attribute. There are two recognition results for the gender, namely, male and female. Therefore, d=2, and h has two values: 1 and 2. In the foregoing example, the number of the gender attribute is 2, and k=2. If gender of a current face image is female, (0, 1) may be used as an attribute value of a gender attribute of the face image. A predicted value calculated by using the attribute recognition model is (0.2, 0.8). During calculation of a loss value $L_2$ of the gender attribute of the face image, $L_2$ may be calculated according to the formula. $L_2$ is approximately 0.19382, and a calculation formula is as follows:

$$L_2 = -\log(1-0.2) - \log(0.8).$$

In step 204, the method may include performing weighted summation on the loss values of the plurality of attributes to obtain a total loss value of the plurality of attributes.

The electronic device may perform weighted summation on the loss values of the plurality of attributes to obtain the total loss value of the plurality of attributes. A weighted summation formula may be:

$$L\_all = a_1 * L_1 + a_2 * L_2 + \ldots + a_n * L_n, \text{ where}$$

$L_1, L_2, \ldots$, and $L_n$ are loss values of the attributes that are calculated by using the first target function and the second target function, $a_1, a_2, \ldots$, and $a_n$ are loss function weight coefficients, and a value range is (0,1), n represents a quantity of attributes recognized from the face image, and L_all is the total loss value of the plurality of attributes.

The loss function weight coefficients are generally 1, indicating that weights of the attributes in the attribute recognition model are equal. In this case, L_all= $L_1 + L_2 + \ldots + L_n$.

The total loss value of the plurality of attributes may represent values of differences between predicted values and attribute values that are obtained through recognition by using a current initial model. When the total loss value is relatively large, it may indicate that a recognition result of the current initial model is inaccurate. When the total loss value is very small, it may indicate that a recognition result of the current initial model is relatively accurate.

In step 205, the method may include adjusting parameters of the sub-models corresponding to the different attributes in the initial model, and stopping the adjustment when the adjusted parameters cause the total loss value of the plurality of attributes to be less than or equal to a target threshold.

When the total loss value calculated according to the predicted values calculated by using the initial model and the input attribute values are relatively large, the electronic device may adjust the parameters of the sub-models corresponding to the different attributes in the initial model, then calculate the predicted values of the plurality of attributes of the face image based on the adjusted parameters, calculate the loss value of each attribute according to the predicted value and an attribute value that corresponds to each sub-model, calculate a loss value of each attribute, perform weighted summation on the loss values of the plurality of attributes to obtain the total loss value of the plurality of attributes, and determine whether the total loss value satisfies a target condition. When the total loss value satisfies the target condition, the electronic device may stop the foregoing process of first adjusting the parameters and then calculating. Therefore, training of the attribute recognition model is completed, and parameters obtained after the last adjustment, of the sub-models corresponding to the different attributes, are used as parameters of the sub-models corresponding to the different attributes in the attribute recognition model obtained through final training.

The target condition may be that the total loss value of the plurality of attributes is less than or equal to the target threshold. The target threshold may be set according to a face attribute recognition requirement. A value of the target threshold determines recognition precision of the attribute recognition model. The target threshold is usually set to a very small value. Therefore, an objective of training the attribute recognition model is to use the attribute recognition model to recognize attribute values of a plurality of attributes of a face image. The total loss value needs to be close to 0, so that predicted values and attribute values that are calculated by using the attribute recognition model are equal or substantially equal to each other.

According to an embodiment, for the parameters of the sub-model corresponding to the different attributes in the foregoing adjustment model, during training of the attribute recognition model, a stochastic gradient descent method may be used. The stochastic gradient descent method is used as an optimal algorithm, and is applicable to a relatively large quantity of variables. Therefore, an optimal process of an accurate mathematic model may be established.

Figure 3:
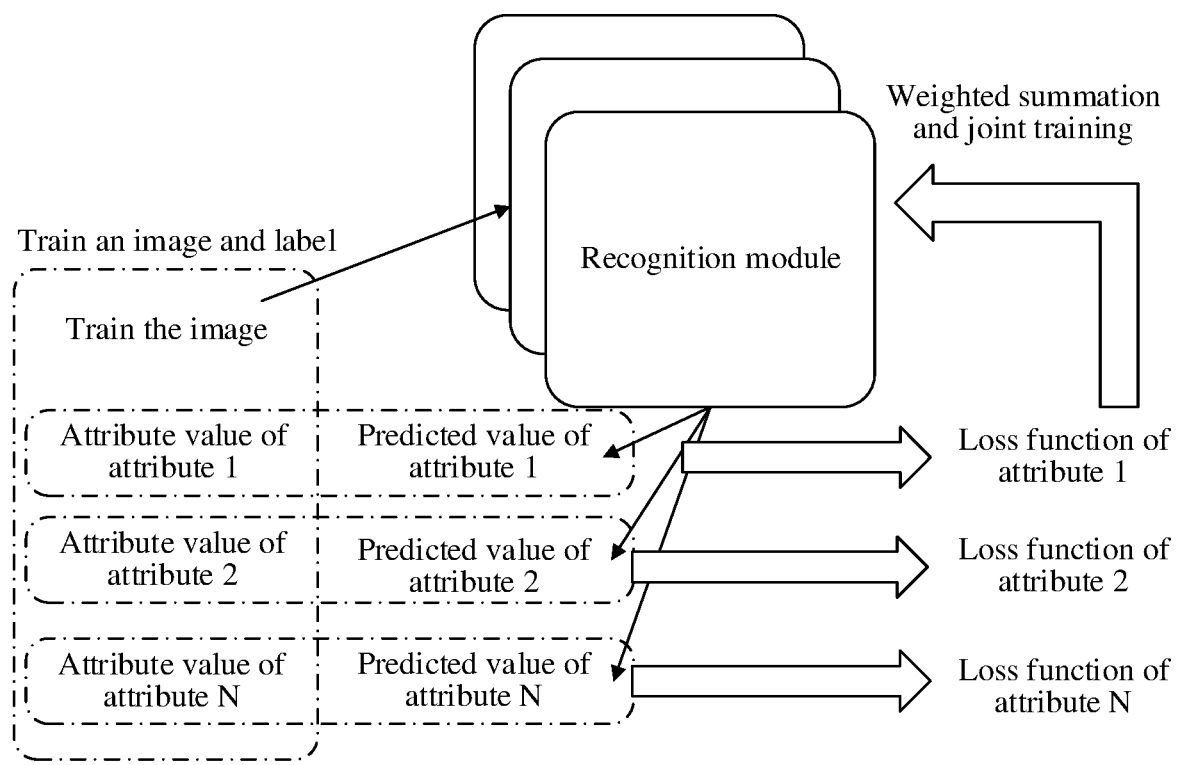
FIG. 3 is a schematic diagram of an attribute recognition model training method according to an embodiment.

According to the foregoing steps, an attribute recognition model used for face attribute recognition may be obtained through training. FIG. 3 is a schematic diagram of an attribute recognition model training method according to an embodiment. As shown in FIG. 3, in the attribute recognition model training process, an image required for training is input into an initial model. The image may include attribute values of a plurality of attributes of the image. The initial model calculates a predicted value of each attribute, and then calculate a loss value of each attribute according to an attribute value and the predicted value of each attribute. The weighted summation is performed on loss values of the plurality of attributes, and the loss values may be input into the initial model. Here, multiple trainings of the plurality of attributes may be performed on the initial model. Finally, an attribute recognition model of relatively high recognition precision may be obtained.

According to an embodiment, a parallel calculation may be performed on the plurality of attributes of the face image. Here, different calculation manners may be used according to different types of the attributes. Differences between calculation results and actual values of the plurality of attributes are calculated, and parameters of a sub-model corresponding to each attribute in the initial model may be adjusted, so that the differences decrease to expected recognition precision, so that the training process of the attribute recognition model is completed. In consideration of the different types of the attributes, and by using calculation manners corresponding to the types, recognition precision of the attribute recognition model obtained through training may be improved.

The foregoing training process of the attribute recognition model may be implemented on an electronic device. The electronic device may be provided as a terminal, or may be provided as a server. However, the embodiments of the electronic device is not limited thereto. When the electronic device has a face attribute recognition capability, the attribute recognition model may be obtained through training. A to-be-recognized image is recognized, to obtain face attributes of the image.

Figure 4:
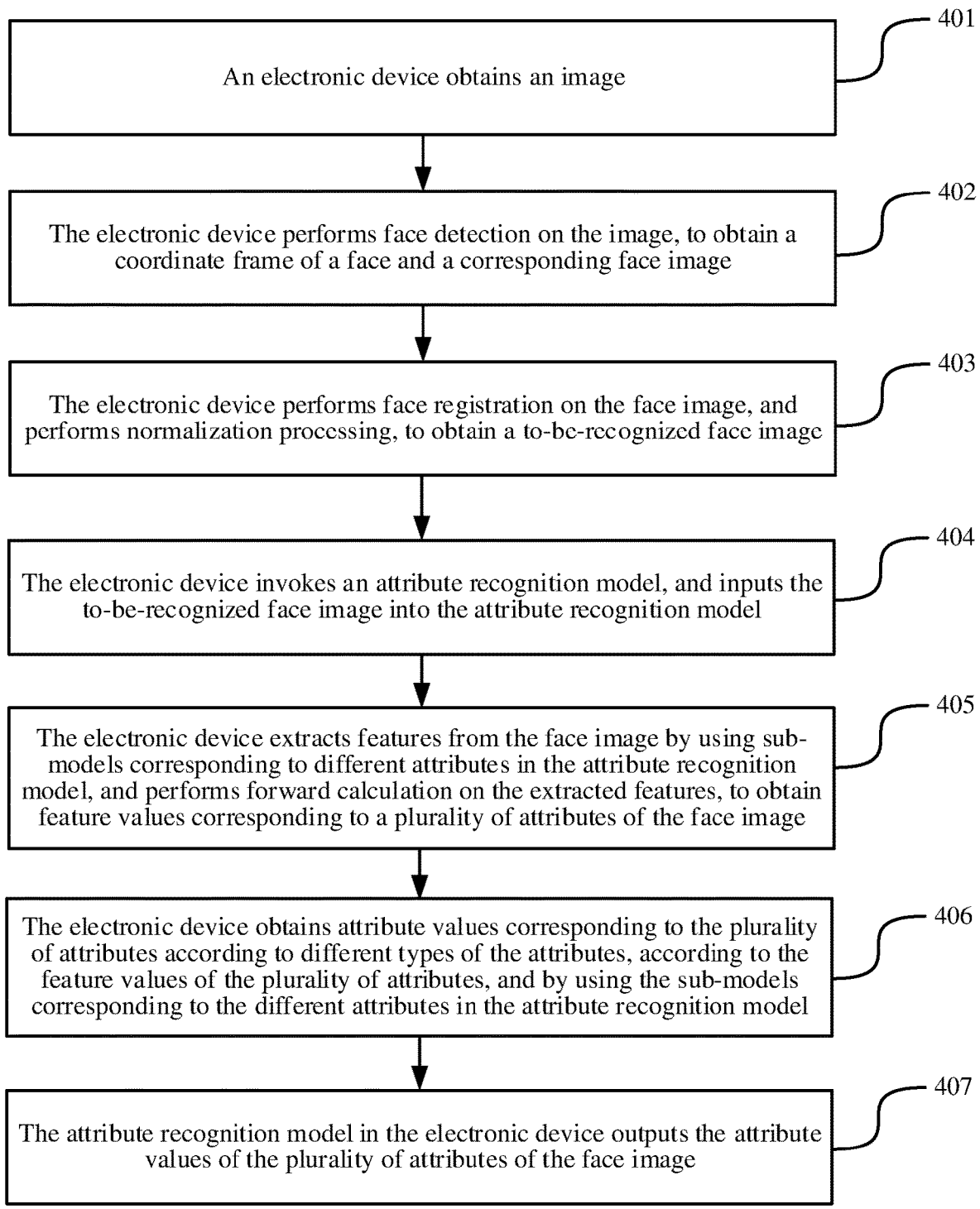
FIG. 4 is a flowchart of a face attribute recognition method according to an embodiment.

FIG. 4 is a flowchart of a face attribute recognition method according to an embodiment. Referring to FIG. 4, the method may include the following steps.

In step 401, the method may include obtaining an image

If the electronic device has a face attribute recognition function, it may preprocess the obtained image. When the image includes a face, the electronic device may further invoke an attribute recognition model, and perform face attribute recognition on the image to obtain attribute values of a plurality of attributes of the face in the image. The electronic device may further display the attribute values of the plurality of attributes of the face that are obtained through recognition, so that a user may intuitively learn of the image.

The electronic device may obtain the image in a plurality of manners. For example, the electronic device may capture an image by using a camera, a video recorder, or the like. The electronic device may download an image from a website through a network connection. The electronic device may receive the image by exchanging data with another electronic device. Furthermore, the electronic device may obtain an image in other manners not described herein.

In step 402, the method may include performing face detection on the image to obtain a coordinate frame of a face and a corresponding face image.

After obtaining the image, the electronic device may perform face detection on the image to learn whether the image includes a face. When the image includes a face, a coordinate frame of the face and a corresponding face image may further be obtained. The face detection may refer to a process in which assuming that one or more faces exist in the image, locations, sizes, and postures of all the faces in the image are obtained.

The electronic device may perform face detection on the image by using a face detection algorithm. A target quantity of features in the image may be extracted. Locations, sizes, and postures of faces may be obtained according to the extracted features to obtain information about all the faces included in the image.

Specifically, the electronic device may perform face detection on the image by using any one of face detection algorithms, such as a geometric feature-based face detection algorithm, a partial feature analysis-based face detection algorithm, a feature face method, and a statistics-based face detection algorithm, or by using a neural network model, a hidden Markov model, or another detection model. Alternatively, the electronic device may perform model training based on a sample image in a face detection database and known face information of the sample image to obtain a face detection model, and implement the foregoing face detection process by using the face detection model. A specific face detection manner used by the electronic device to perform face detection on the image is not limited to embodiments disclosed herein.

According to an embodiment, a process in which the electronic device performs face detection on the image may be described as follows:

An image in the electronic device may be in a form of a matrix. The electronic device may compare and determine a relationship between values in the matrix, different pixels in the matrix and known face feature parameters, and obtain information about contours of parts of a face and information about an outer contour of the face. The information may include sizes, locations, distances, and the like, so that the obtained face information may be calculated to obtain a coordinate frame of the face in the image and a corresponding image.

In step 403, the method may include performing face registration on the face image, and performing a normalization process to obtain a to-be-recognized face image.

The electronic device may perform face registration on the face image on which face detection is performed, and perform normalization processing on the face image according to data obtained through registration to obtain a to-be-recognized image. The to-be-recognized image is an image obtained after preprocessing. The electronic device may input the to-be-recognized image into the attribute recognition model for face attribute recognition.

Face registration may refer to a process in which locations of face feature parts are further obtained based on face detection. The face feature parts may include eyes, eyebrows, nose, mouth, and an outer contour of the face. Normalization processing may refer to operations, such as rotation, zooming, and cutting of the face image, so that a lateral ratio and a longitudinal ratio of the face image are consistent with a standard structure of the face, so that face recognition precision can be improved.

Specifically, for face registration, the electronic device may perform face registration on the face image by using a face registration algorithm. For example, the electronic device may use face registration algorithms, such as an active appearance model (AAM), an active shape model (ASM), and the like.

The electronic device may perform face registration on the face image by using any one of the foregoing face registration algorithms. Alternatively, the electronic device may perform model training based on a sample face image and coordinates of known face feature parts of the sample face image, to obtain a face registration model, and implement the foregoing face registration process by using the face registration model. The coordinates of the known face feature parts of the sample face image may be obtained when the sample face image is obtained, or may be obtained by manually marking face feature parts for the sample face image after the sample face image is obtained. A specific face registration method used by the electronic device to perform face registration on the face image is not limited to embodiments disclosed herein.

For normalization processing, the electronic device may perform operations, such as measurement and rotation on the face image according to the coordinates of the face feature parts that are obtained in the face registration step, so that parameters of the face image satisfy the standard structure of the face.

Specifically, the electronic device may obtain coordinates of a central location between left and right eyes from coordinates of the face feature parts obtained through face registration, calculate an angle between a central connection line of the left and right eyes and a horizontal line. For example, the central connection line may refer to a line between a center of a right eye and a center of a left eye. Subsequently, the electronic device may use the angle as a rotation angle to rotate the face image, so that the central connection line of the left and right eyes is parallel to the horizontal line. The electronic device may further calculate a length of the central connection line of the left and right eyes, and zoom the face image, so that the length of the central connection line of the left and right eyes is equal to a target length. The target length is a length, defined in the standard structure of the face, of a central connection line of left and right eyes.

The foregoing steps 401 to 403 are a process of obtaining the to-be-recognized face image, that is, a process in which the electronic device may perform face detection, face registration, and normalization processing on the obtained image to obtain the to-be-recognized face image, so that the electronic device may subsequently input the to-be-recognized face image into the attribute recognition model for recognition. The foregoing steps are merely an example scenario. In an embodiment, there may be another possible scenario. For example, the electronic device may directly obtain the to-be-recognized face image, and perform a subsequent recognition process on the to-be-recognized face image.

In step 404, the method may include implementing an attribute recognition model and inputting the to-be-recognized face image into the attribute recognition model.

The attribute recognition model may be an attribute recognition model obtained by using the foregoing attribute recognition model training method. The attribute recognition model may be used to perform parallel recognition on the plurality of attributes of the input face image, and output the attribute values of the plurality of attributes of the face image. The attribute recognition model may be preset in the electronic device. The electronic device may implement the attribute recognition model when there is a face attribute recognition requirement for the face image, and input the to-be-recognized face image into the attribute recognition model. When the electronic device is provided as a terminal, the terminal may locally implement the preset attribute recognition model, or obtain a trained attribute recognition model from a server. However, the implementation of the attribute recognition model is not limited to the embodiments described herein.

In step 405, the method may include extracting features from the face image by using sub-models corresponding to different attributes in the attribute recognition model, and performing forward calculation on the extracted features to obtain feature values corresponding to a plurality of attributes of the face image.

If the sub-models corresponding to the different attributes in the attribute recognition model need to recognize different attributes, the sub-models may need to obtain different face features. Each sub-model may extract features required in a recognition process of the sub-model from the input face image, and perform forward calculation on the extracted features to obtain the feature values corresponding to the plurality of attributes of the face image. A process of the forward calculation may be similar to that in step 202. In each sub-model, multi-layer calculation may be performed on the features to obtain a feature value corresponding to a corresponding attribute of the sub-model. The feature value is an output of the last layer in step 202.

In step 406, the method may include obtaining attribute values corresponding to the plurality of attributes, according to different types of the attributes, feature values of the plurality of attributes, and sub-models corresponding to the different attributes in the attribute recognition model. Because the attributes may have different types, the finally output feature values may also have different forms: a numeric form and a vector form.

For each of the plurality of attributes, in a case that the attribute is a regression attribute, a feature value corresponding to the attribute is in a numeric form, and the feature value, output by the sub-model, corresponding to the attribute is obtained as the attribute value corresponding to the attribute.

In a case that the attribute is not a regression attribute, a feature value corresponding to the attribute is in a vector form, and a normalized calculation may be performed on the feature value to obtain a prediction vector corresponding to the attribute, where each digit in a predicted value in the prediction vector is a probability that the attribute is a recognized result, and a predicted value corresponding to the recognized result having the largest probability is used as the attribute value corresponding to the attribute.

In step 407, the method may include outputting the attribute values of the plurality of attributes of the face image.

Each sub-model in the attribute recognition model may output an attribute value of a corresponding attribute. Accordingly, the attribute recognition model in the electronic device may output the attribute values of the plurality of attributes corresponding to the face image. The attribute value of each attribute is used for indicating recognition results of the plurality of attributes of the face image.

The foregoing steps 404 to 407 are a process of implementing the attribute recognition model, inputting the face image into the attribute recognition model, performing forward calculation on the face image by using the attribute recognition model, obtaining the attribute values according to the different types of the attributes, and outputting a plurality of attribute values of the face image. In an embodiment, when the electronic device is provided as a terminal, and the terminal is in an online state, the terminal may further send the to-be-recognized face image to a server. The server stores the attribute recognition model obtained through training by using the attribute recognition model training method provided in the embodiments shown in FIG. 2 and FIG. 3. The server receives a to-be-recognized face image, and may input the face image into the attribute recognition model. The attribute recognition model performs a subsequent attribute recognition process on the face image. After the attribute recognition model outputs attribute values of a plurality of face attributes, the server may send the plurality of attribute values to the terminal, so that a face attribute recognition process is implemented. The terminal may alternatively invoke an attribute recognition model stored in the terminal, and perform attribute recognition on a face image. The electronic device may alternatively be a server. However, the electronic device disclosed herein are not limited thereto.

After completing the foregoing recognition process, the electronic device may display the plurality of attributes of the face image. For example, each of the plurality of attribute values of the face image that are output by the attribute recognition model may be a value whose value range is [0, 1], and is an attribute value obtained after normalization processing. Therefore, when the electronic device needs to display the plurality of attribute values of the face image, the attribute values output by the attribute recognition model cannot enable a user to intuitively learn of the plurality of attributes of the current face image, As such, before the electronic device displays the plurality of attribute values, the electronic device may perform inverse normalization processing on the plurality of attribute values. A process of the inverse normalization processing may include the following.

For each of the plurality of attributes, when the attribute is a regression attribute, a multiplication operation may be performed on the attribute value of the attribute and a corresponding factor, to obtain an attribute value to express the attribute.

When the attribute is not a regression attribute, a number corresponding to the attribute value of the attribute may be obtained as the attribute value of the attribute.

For example, if an age attribute of a face in a face image is 20 years old and an expression attribute is fear, then a number corresponding to fear is 2, and after a recognition process of an attribute recognition model, attribute values of a plurality of attributes of the face image may be obtained. An attribute value of the age attribute of the face image may be 0.2, an attribute value of the expression attribute may be 0.99, and a number of 0.99 corresponding to a digit in a vector is 2. When the electronic device needs to display the age attribute and the expression attribute of the face image, inverse normalization processing may be performed on the attribute value 0.2 of the age attribute, to obtain 20, and the age attribute is displayed as 20. The number 2 corresponding to the attribute value 0.99 of the expression attribute may be obtained as the attribute value of the expression attribute, and the expression attribute is displayed as 2. Certainly, the electronic device may alternatively associate the number with word representation of the expression attribute, and display the expression attribute as "fear".

In an embodiment, the electronic device may perform face detection, face registration, normalization processing, and the like on an obtained image, and then input the processed image into an attribute recognition model. The attribute recognition model performs face attribute recognition on the processed image. In addition, in a recognition process, different processing manners may be used for the attribute recognition model according to different types of attributes. That is, situations in which the attributes are respectively a continuous variable and a qualitative variable, recognition precision of the continuous variable in the face attribute recognition may be improved. Further, the image may be preprocessed, and data input into the model may be data obtained after normalization processing, so that difficulty of a model calculation process may be reduced, and precision of face attribute recognition may be improved.

Figure 5:
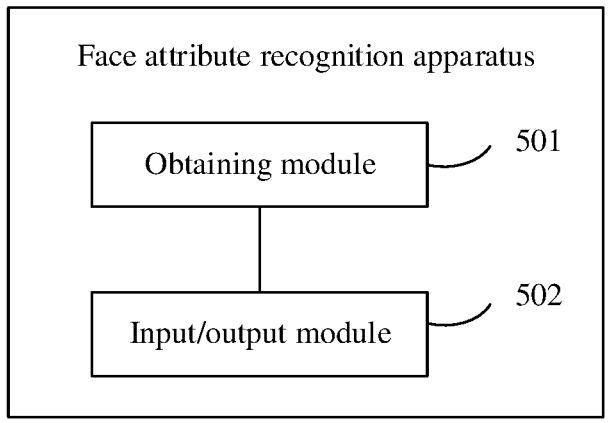
FIG. 5 is a schematic structural diagram of a face attribute recognition apparatus according to an embodiment.

FIG. 5 is a schematic structural diagram of a face attribute recognition apparatus according to an embodiment. Referring to FIG. 5, the apparatus may include an obtaining module 501 configured to obtain a to-be-recognized face image and an input/output module 502 configured to invoke an attribute recognition model, input the face image into the attribute recognition model, perform forward calculation on the face image by using the attribute recognition model to obtain attribute values according to different types of attributes, and output a plurality of attribute values of the face image, the plurality of attribute values of the attributes being used for indicating recognition results of a plurality of attributes of the face image.

Here, the attribute recognition model may be obtained through training based on a plurality of sample face images, a plurality of known attribute recognition results of the plurality of sample face images and according to the different types of the attributes.

Figure 6:
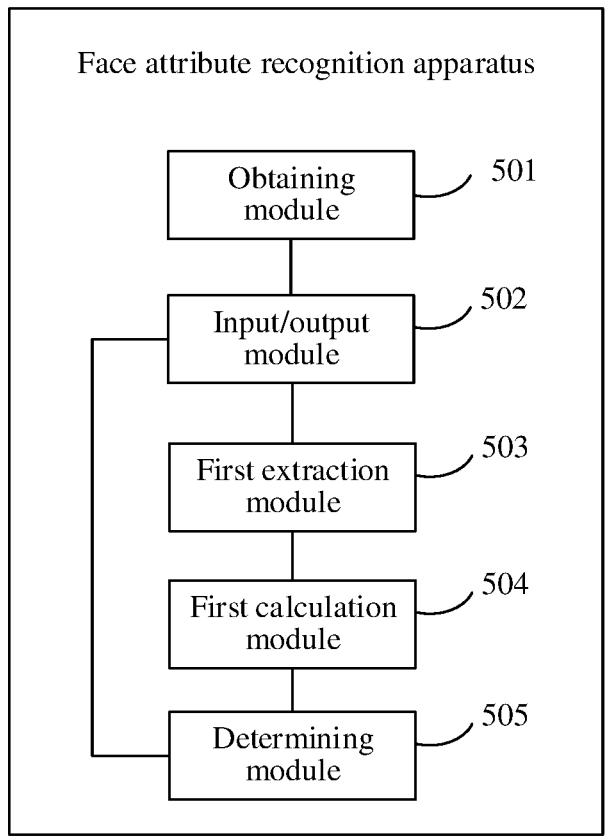
FIG. 6 is another schematic structural diagram of a face attribute recognition apparatus according to an embodiment.

According to an embodiment, referring to FIG. 6, the apparatus further may further include a first extraction module 503 configured to extract face features of the face image, a first calculation module 504 configured to perform forward calculation on the face features according to sub-models corresponding to the different attributes in the attribute recognition model, to obtain feature values corresponding to the plurality of attributes of the face image, and a determining module 505, configured to, for each of the plurality of attributes, in a case that the attribute is a regression attribute, use a feature value corresponding to the attribute as an attribute value corresponding to the attribute, or the determining module 505 configured to, in a case that the attribute is not a regression attribute, perform normalized calculation on each digit in a feature value corresponding to the attribute, to obtain a prediction vector corresponding to the attribute, where each digit in a predicted value in the prediction vector is a probability that the attribute is a recognition result indicated by the digit, where the determining module 505 may be further configured to use a predicted value corresponding to a recognition result having the largest probability as the attribute value corresponding to the attribute.

Figure 7:
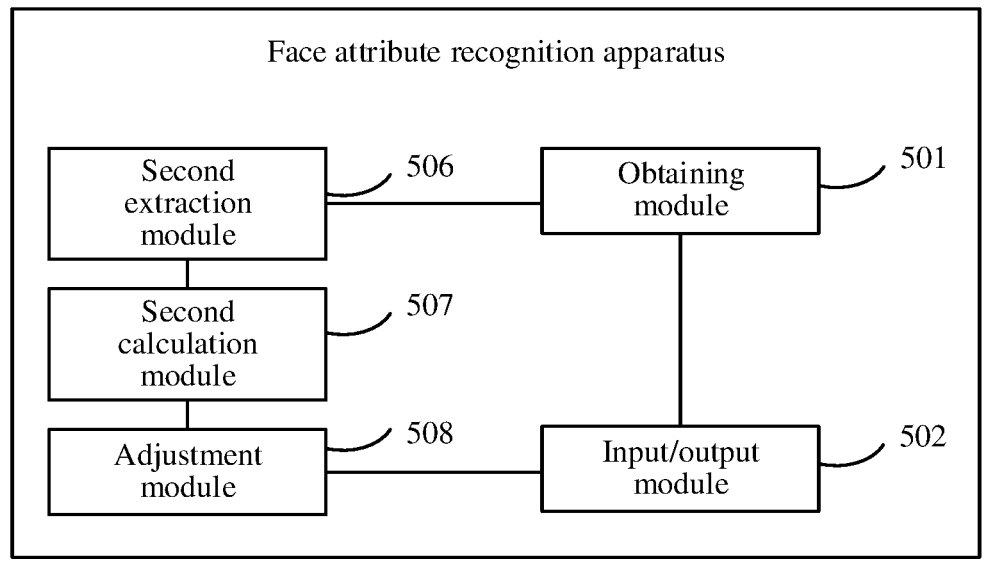
FIG. 7 is still another schematic structural diagram of a face attribute recognition apparatus according to an embodiment.

According to an embodiment, referring to FIG. 7, the obtaining module 501 may be further configured to obtain a plurality of pieces of sample face data, where the plurality of pieces of sample face data includes a plurality of sample face images and attribute values corresponding to a plurality of attributes of each sample face image, and a second extraction module 506 configured to extract face features of the sample face image, a second calculation module 507 configured to perform forward calculation on the face features of the sample face image according to sub-models corresponding to different attributes in an initial model, to obtain predicted values of the plurality of attributes of the sample face image, where the second calculation module 507 may be configured to calculate loss values of the plurality of attributes according to the predicted values and attribute values of the plurality of attributes of the sample face image and according to different types of the attributes, the second calculation module 507 may be further configured to perform weighted summation on the loss values of the plurality of attributes, to obtain a total loss value of the plurality of attributes, and an adjustment module 508 configured to adjust parameters of the sub-models corresponding to the different attributes in the initial model, and stop the adjustment when the adjusted parameters cause the total loss value of the plurality of attributes to be less than or equal to a target threshold.

In an embodiment, the second calculation module 507 may be configured to, for each of the plurality of attributes, in a case that the attribute is a regression attribute, calculate a predicted value and an attribute value of the attribute by using a first target function, to obtain a loss value corresponding to the attribute, where the first target function is used for calculating a loss value of a continuous variable, or in a case that the attribute is not a regression attribute, calculate a prediction vector and an attribute vector of the attribute by using a second target function, to obtain a loss value corresponding to the attribute, where the second target function is used for calculating a loss value of a qualitative variable.

In an embodiment, the first target function may be a Euclidean loss function and the second target function may be a cross entropy loss function.

Figure 8:
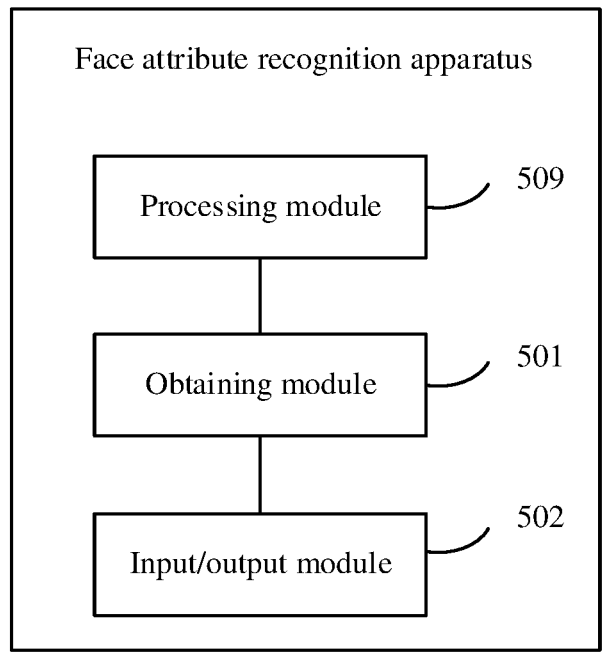
FIG. 8 is another schematic structural diagram of a face attribute recognition apparatus according to an embodiment.

In an embodiment, referring to FIG. 8, the apparatus may further include a processing module 509 configured to perform face detection on an image, face registration on a detected face image, and normalization processing on the face image, to obtain the to-be-recognized face image.

When the face attribute recognition apparatus provided in the foregoing embodiments implement face attribute recognition, it is illustrated with an example of division of the foregoing function modules. In a practical application, the foregoing functions may be allocated to different function modules according to various requirements, that is, the internal structure of the apparatus may be divided into different function modules to complete all or some of the functions described above.

Figure 9:
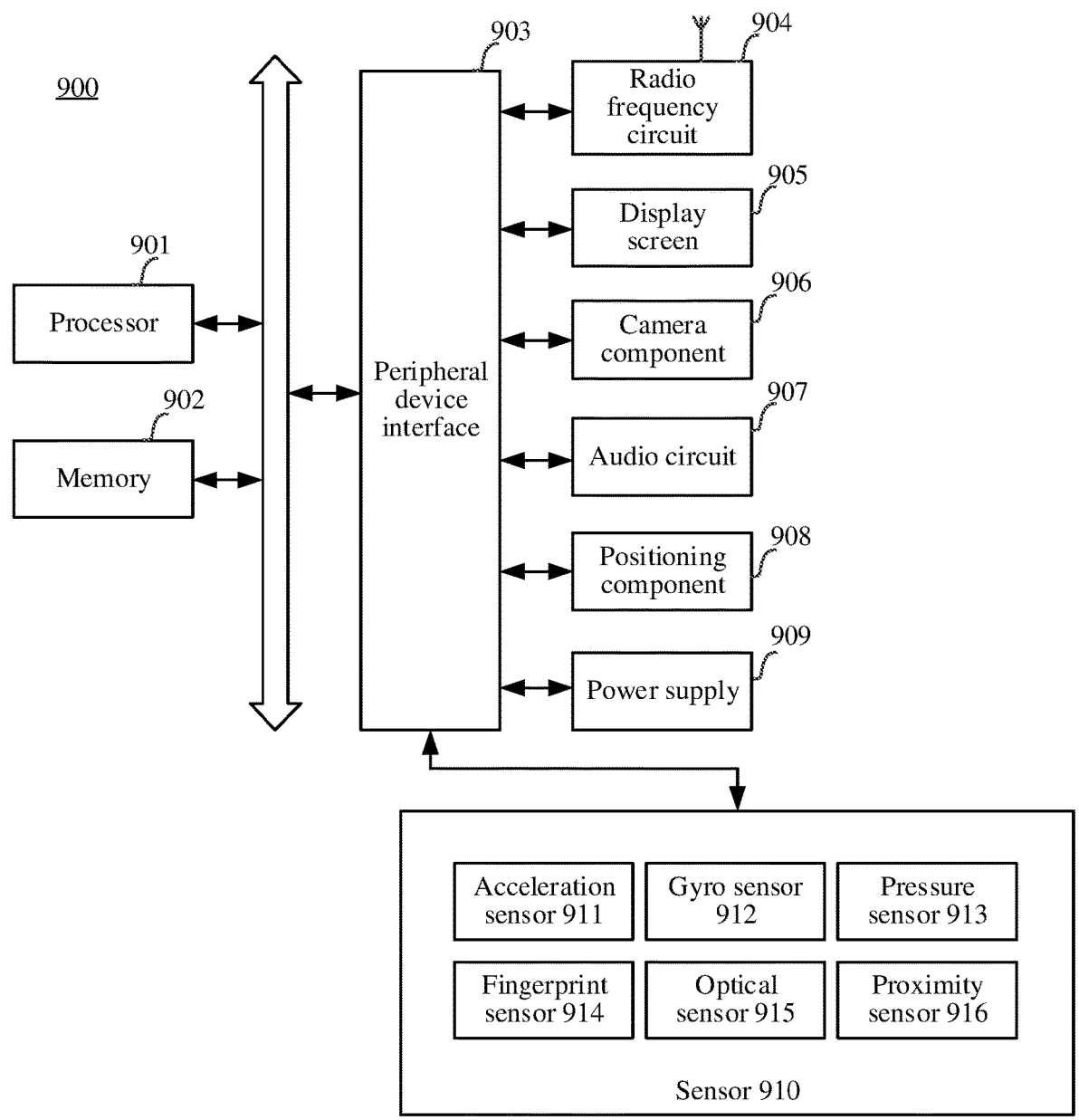
FIG. 9 is a structural block diagram of an electronic device 900 according to an embodiment.

FIG. 9 is a structural block diagram of an electronic device 900 according to an embodiment. The electronic device 900 may be a terminal. The electronic device 900 may be a smartphone, a tablet computer, a Moving Picture Experts Group Audio Layer III (MP3) player, a Moving Picture Experts Group Audio Layer IV (MP4) player, a notebook computer, a desktop computer, and the like. The electronic device 900 may also be referred to as user equipment, a portable terminal, a laptop terminal, a desktop terminal, or the like.

The electronic device 900 may include a processor 901 and a memory 902.

The processor 901 may include one or more processing cores, for example, a quad-core processor and an eight-core processor. The processor 901 may be implemented in at least one hardware form of digital signal processing (DSP), a field-programmable gate array (FPGA), and a programmable logic array (PLA). The processor 901 may include a main processor and a co-processor. The processor may be configured to process data in an awaken state, and may also be referred to as a central processing unit (CPU). The co-processor is a low-power processor configured to process data in a standby state. In some embodiments, the processor 901 may be integrated with a graphics processing unit (GPU). The GPU is responsible for rendering and drawing content to be displayed by a display screen. In some embodiments, the processor 901 may further include an artificial intelligence (AI) processor. The AI processor may be configured to process a calculation operation related to machine learning.

The memory 902 may include one or more computer-readable storage mediums. The computer-readable storage medium may be non-transitory. The memory 902 may further include a high speed random access memory (RAM) and a non-volatile memory, for example, one or more magnetic disk storage devices and flash memory devices. In some embodiments, the non-transitory computer-readable storage medium in the memory 902 may be configured to store at least one instruction. The at least one the instruction may be executed by the processor 901 to implement method operations of the following face attribute recognition method. The face attribute recognition method including obtaining a to-be-recognized face image and invoking an attribute recognition model, inputting the face image into the attribute recognition model, performing forward calculation on the face image by using the attribute recognition model, to obtain attribute values according to different types of attributes, and outputting a plurality of attribute values of the face image, the plurality of attribute values being used for indicating recognition results of a plurality of attributes of the face image, where the attribute recognition model being obtained through training based on a plurality of sample face images, a plurality of known attribute recognition results of the plurality of sample face images and according to the different types of the attributes.

In an embodiment, the processor 901 may be configured to extract face features of the face image, perform forward calculation on the face features according to sub-models corresponding to the different attributes in the attribute recognition model, to obtain feature values corresponding to the plurality of attributes of the face image, for each of the plurality of attributes, in a case that the attribute is a regression attribute, use a feature value corresponding to the attribute as an attribute value corresponding to the attribute, or in a case that the attribute is not a regression attribute, perform normalized calculation on each digit in a feature value corresponding to the attribute, to obtain a prediction vector corresponding to the attribute, where each digit in a predicted value in the prediction vector is a probability that the attribute is a recognition result indicated by the digit, and use a predicted value corresponding to a recognition result having the largest probability as the attribute value corresponding to the attribute.

In an embodiment, the processor 901 may be further configured to obtain a plurality of pieces of sample face data, where the plurality of pieces of sample face data includes a plurality of sample face images and attribute values corresponding to a plurality of attributes of each sample face image, extract face features of the sample face image, perform forward calculation on the face features of the sample face image according to sub-models corresponding to different attributes in an initial model, to obtain predicted values of the plurality of attributes of the sample face image, calculate loss values of the plurality of attributes according to the predicted values and the attribute values of the plurality of attributes of the sample face image and according to different types of the attributes, perform weighted summation on the loss values of the plurality of attributes, to obtain a total loss value of the plurality of attributes, and adjust parameters of the sub-models corresponding to the different attributes in the initial model, and stop the adjustment until the adjusted parameters cause the total loss value of the plurality of attributes to be less than or equal to a target threshold.

In an embodiment, the processor 901 may be further configured to, for each of the plurality of attributes, in a case that the attribute is a regression attribute, calculate a predicted value and an attribute value of the attribute by using a first target function, to obtain a loss value corresponding to the attribute, where the first target function is used for calculating a loss value of a continuous variable, or in a case that the attribute is not a regression attribute, calculate a prediction vector and an attribute vector of the attribute by using a second target function, to obtain a loss value corresponding to the attribute, where the second target function is used for calculating a loss value of a qualitative variable.

In an embodiment, the first target function may be a Euclidean loss function and the second target function may be a cross entropy loss function.

In an embodiment, the processor 901 may be configured to perform face detection on an image, face registration on a detected face image, and normalization processing on the face image, to obtain the to-be-recognized face image.

In some embodiments, the electronic device 900 may include a peripheral device interface 903 and at least one peripheral device. The processor 901, the memory 902, and the peripheral device interface 903 may be connected through a bus or a signal cable. The peripheral devices may be connected to the peripheral device interface 903 through a bus, a signal cable, or a circuit board. Specifically, the peripheral device may include at least one of a radio frequency (RF) circuit 904, a touch display screen 905, a camera 906, and an audio circuit 907, a positioning component 908, and a power supply 909.

The peripheral device interface 903 may be configured to connect at least one input/output (110)-related peripheral device to the processor 901 and the memory 902. In some embodiments, the processor 901, the memory 902, and the peripheral device interface 903 may be integrated on one chip or circuit board. In some embodiments, any one or a combination of the processor 901, the memory 902, and the peripheral device interface 903 may be implemented on a separate chip or circuit board. However, the embodiments of the peripheral device interface 903 are not limited thereto.

The radio frequency (RF) circuit 904 may be configured to receive and transmit a RF signal, which is also referred to as an electromagnetic signal. The RF circuit 904 communicates with a communications network and another communications device through the electromagnetic signal. The RF circuit 904 converts an electrical signal into an electromagnetic signal for transmission, or converts a received electromagnetic signal into an electrical signal. Furthermore, the RF circuit 904 may include an antenna system, an RF transceiver, one or more amplifiers, a tuner, an oscillator, a digital signal processor, an encoding and decoding chip set, a subscriber identity module card, and the like. The RF circuit 904 may communicate with another terminal by using at least one wireless communication protocol. The wireless communication protocol includes, but is not limited to, a World Wide Web, a metropolitan area network, an intranet, various generations of mobile communications networks (2G, 3G, 4G, and 5G), a wireless local area network and/or a wireless fidelity (WiFi) network. In some embodiments, the RF circuit 904 may further include a near field communication (NFC)-related circuit. However, the embodiments of the RF circuit 904 are not limited thereto.

The display screen 905 may be configured to display a user interface (UI). The UI may include a graphic, text, an icon, a video, and any combination thereof. When the display screen 905 is a touch display screen, the display screen 905 further has a capability of acquiring a touch signal on a surface of the display screen 905 or above the surface. The touch signal may be used as a control signal to be input into the processor 901 for processing. In this case, the display screen 905 may further be configured to provide a virtual button and/or a virtual keyboard, which is also referred to as a soft button and/or a soft keyboard. In some embodiments, there may be one display screen 905, disposed on a front panel of the electronic device 900. In other embodiments, there may be at least two display screens 905, respectively disposed on different surfaces of the electronic device 900 or designed as folded. In still other embodiments, the display screen 905 may be a flexible display screen, disposed on a bent surface or a folded face of the electronic device 900. Even, the display screen 905 may further be set to be a non-rectangular irregular graphic, namely, an odd-form screen. The display screen 905 may be prepared by using a material such as a liquid crystal display (LCD) and an organic light-emitting diode (OLED).

The camera component 906 may be configured to acquire an image or a video. Here, the camera component 906 may include a front-facing camera and a rear-facing camera. The front-facing camera may be disposed on a front panel of a terminal, and the rear-facing camera may be disposed on a reverse side of the terminal. In some embodiments, there may be at least two rear-facing cameras, which are any one of a master camera, a depth of field camera, a wide-angle camera, and a long-focus camera. For example, the master camera and the depth of field camera may be combined to implement a background virtualization function, the master camera and the wide-angle camera may be combined to implement panorama shooting and virtual reality (VR) shooting functions, or others may be combined to implement a shooting function. In some embodiments, the camera the component 906 may further include a flash. The flash may be a single color temperature flash, or may be a double color temperature flash. The double color temperature flash may refer to a combination of a warm light flash and a cold light flash, and may be used for light compensation in different color temperatures.

The audio circuit 907 may include a microphone and a speaker. The microphone may be configured to acquire sound waves of a user and an environment, and convert the sound waves into an electrical signal to be input into the processor 901 for processing, or to be input into the RF circuit 904 to implement voice communication. For a purpose of stereo acquisition or noise reduction, there may be a plurality of microphones, respectively disposed at different parts of the electronic device 900. The microphones may further be array microphones or omni-directional acquisition-type microphone. The speaker may be configured to convert the electrical signal from the processor 901 or the RF circuit 904 into sound waves. The speaker may be a conventional film speaker, or may be a piezoelectric ceramic speaker. When the speaker is a piezoelectric ceramic speaker, the speaker may convert the electrical signal into sound waves that human beings can hear, or may convert the electrical signal into sound waves that human beings cannot hear to measure a distance and so on. In some embodiments, the audio circuit 907 may further include an earphone jack.

The positioning component 908 may be configured to position a current geographical location of the electronic device 900 to implement navigation or a location based service (LBS). The positioning component 908 may be a positioning component based on a global positioning system (GPS) of the USA, a BeiDou system of China, or a GALILEO System of Russia.

The power supply 909 may be configured to supply power to the components in the electronic device 900. The power supply 909 may be an alternating current, a direct current, a disposable battery, or a rechargeable battery. When the power supply 909 includes a rechargeable battery. The rechargeable battery may be a wired charging battery or a wireless charging battery. The wired charging battery is a battery charged through a wired circuit, and the wireless charging battery is a battery charged through a wireless coil. The rechargeable battery may further be configured to support a fast charging technology.

In some embodiments, the electronic device 900 may further include one or more sensors 910. The one or more sensors 910 may include, but are not limited to, an acceleration sensor 911, a gyro sensor 912, a pressure sensor 913, a fingerprint sensor 914, an optical sensor 915, and a proximity sensor 916.

The acceleration sensor 911 may detect acceleration values on three coordinate axes of a coordinate system established by the electronic device 900. For example, the acceleration sensor 911 may be configured to detect components of gravity acceleration on three coordinate axes. The processor 901 may control, according to a gravity acceleration signal acquired by the acceleration sensor 911, the touch display screen 905 to display the UI by using a lateral view or a longitudinal view. The acceleration sensor 911 may further be configured to acquire a game or sports data of a user.

The gyro sensor 912 may detect a body direction and a rotation angle of the electronic device 900. The gyro sensor 912 may cooperate with the acceleration sensor 911 to acquire a 3D action of the user for the electronic device 900. The processor 901 may implement the following functions according to the data acquired by the gyro sensor 912: action sensing (for example, the UI is changed according to a tilting operation of the user), image stabilizing during shooting, game control, inertial navigation, and other functions not specifically disclosed herein.

The pressure sensor 913 may be disposed at a side frame of the electronic device 900 and/or a lower layer of the touch display screen 905. When the pressure sensor 913 is disposed at the side frame of the electronic device 900, the pressure sensor 913 may detect a gripping signal of the user for the electronic device 900, and the processor 901 recognizes left and right hands or performs a shortcut operation according to the gripping signal acquired by the pressure sensor 913. When the pressure sensor 913 is disposed at the lower layer of the touch display screen 905, the processor 901 controls an operational control on the UI according to a pressure operation of the user for the touch display screen 905. The operational control includes at least one of a button control, a scroll bar control, an icon control, and a menu control.

The fingerprint sensor 914 may be configured to acquire a fingerprint of the user. The processor 901 may recognize an identity of the user according to the fingerprint acquired by the fingerprint sensor 914, or the fingerprint sensor 914 may recognize an identity of the user according to the acquired fingerprint. When the identity of the user is recognized as a trusted identity, the processor 901 authorizes the user to perform a related sensitivity operation. The sensitivity operation may include, for example, unlocking a screen, viewing encryption information, downloading software, making payment, altering setting, or the like. The fingerprint sensor 914 may be disposed on a front side, a back side, or a side face of the electronic device 900. When the electronic device 900 is provided with a physical button or a vendor Logo, the fingerprint sensor 914 may be integrated with the physical button or the vendor Logo.

The optical sensor 915 may be configured to acquire ambient light intensity. In an embodiment, the processor 901 may control display brightness of the touch display screen 905 according to the ambient light intensity acquired by the optical sensor 915. Specifically, when the ambient light intensity is relatively high, the display brightness of the touch display screen 905 may be increased. When the ambient light intensity is relatively low, the display brightness of the touch display screen 905 may be decreased. In another embodiment, the processor 901 may further dynamically adjust shooting parameters of the camera component 906 according to the ambient light intensity acquired by the optical sensor 915.

The proximity sensor 916, also referred to as a distance sensor, may be disposed at the front panel of the electronic device 900. The proximity sensor 916 may be configured to acquire a distance between the user and a front side of the electronic device 900. In an embodiment, when the proximity sensor 916 detects that the distance between the user and the front side of the electronic device 900 gradually decreases, the processor 901 may control the touch display screen 905 to switch from a screen on state to a screen off state. When the proximity sensor 916 detects that the distance between the user and the front side of the electronic device 900 gradually increases, the processor 901 may control the touch display screen 905 to switch from a screen off state to a screen on state.

A person skilled in the art may understand that the structure shown in FIG. 9 does not constitute a limitation to the electronic device 900, and the electronic device 900 may include more components or fewer components than those shown in the figure, or some components may be combined, or a different component deployment may be used.

Figure 10:
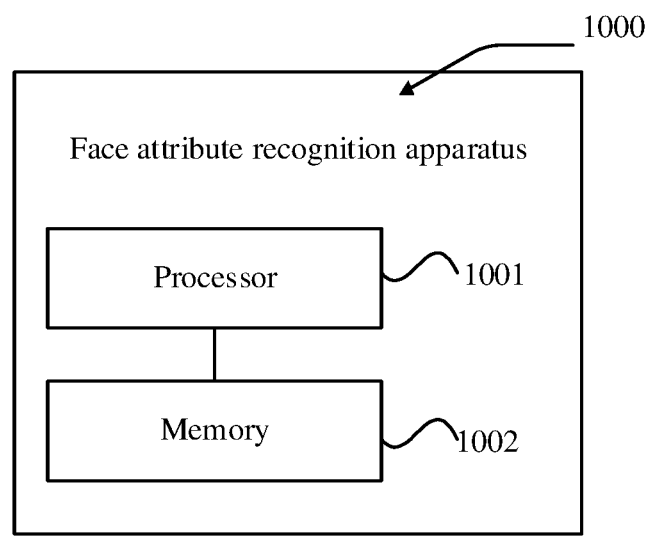
FIG. 10 is a block diagram of a face attribute recognition apparatus 1000 according to an embodiment.

FIG. 10 is a block diagram of a face attribute recognition apparatus 1000 according to an embodiment. For example, the face attribute recognition apparatus 1000 may be provided as a server. Referring to FIG. 10, the face attribute recognition apparatus 1000 may differ greatly due to a different configuration or performance, and may include one or more processors (central processing units, CPU) 1001 and one or more memories 1002. The memory 1002 stores at least one instruction. The at least one instruction may be loaded and executed by the processor 1001 to implement any method operation of the face attribute recognition method in the embodiments described herein. Further, the face attribute recognition apparatus 1000 may include components, such as a wired or wireless network interface, a keyboard, and an input/output interface, to facilitate input and output. The face attribute recognition apparatus 1000 may further include other components configured to implement a device function.

According to an embodiment, a computer-readable storage medium storing a computer program, for example, a memory storing a computer program, may be further provided. The computer program, when executed by a processor, may implement the method operations of the attribute recognition model training method shown in FIGS. 2 and 3 or the face attribute recognition method shown in FIG. 4, and the foregoing embodiments. The method of the attribute recognition model training to be implemented may include obtaining a to-be-recognized face image and invoking an attribute recognition model, inputting the face image into the attribute recognition model, performing forward calculation on the face image by using the attribute recognition model, to obtain attribute values according to different types of attributes, and outputting a plurality of attribute values of the face image, the plurality of attribute values being used for indicating recognition results of a plurality of attributes of the face image, where the attribute recognition model being obtained through training based on a plurality of sample face images, a plurality of known attribute recognition results of the plurality of sample face images and according to the different types of the attributes.

The processor may be further configured to extract face features of the face image, perform forward calculation on the face features according to sub-models corresponding to the different attributes in the attribute recognition model, to obtain feature values corresponding to the plurality of attributes of the face image. For each of the plurality of attributes, in a case that the attribute is a regression attribute, the attribute recognition model may use a feature value corresponding to the attribute as an attribute value corresponding to the attribute, or in a case that the attribute is not a regression attribute, perform normalized calculation on each digit in a feature value corresponding to the attribute, to obtain a prediction vector corresponding to the attribute, where each digit in a predicted value in the prediction vector is a probability that the attribute is a recognition result indicated by the digit, and use a predicted value corresponding to a recognition result having the largest probability as the attribute value corresponding to the attribute.

In an embodiment, the processor may be further configured to obtain a plurality of pieces of sample face data, where the plurality of pieces of sample face data includes a plurality of sample face images and attribute values corresponding to a plurality of attributes of each sample face image, extract face features of the sample face image, perform forward calculation on the face features of the sample face image according to sub-models corresponding to different attributes in an initial model, to obtain predicted values of the plurality of attributes of the sample face image, calculate loss values of the plurality of attributes according to the predicted values and the attribute values of the plurality of attributes of the sample face image and according to different types of the attributes, perform weighted summation on the loss values of the plurality of attributes, to obtain a total loss value of the plurality of attributes, and adjust parameters of the sub-models corresponding to the different attributes in the initial model, and stop the adjustment until the adjusted parameters cause the total loss value of the plurality of attributes to be less than or equal to a target threshold.

In an embodiment, the processor may be further configured to, for each of the plurality of attributes, in a case that the attribute is a regression attribute, calculate a predicted value and an attribute value of the attribute by using a first target function, to obtain a loss value corresponding to the attribute, where the first target function is used for calculating a loss value of a continuous variable, or in a case that the attribute is not a regression attribute, calculate a prediction vector and an attribute vector of the attribute by using a second target function, to obtain a loss value corresponding to the attribute, where the second target function is used for calculating a loss value of a qualitative variable.

In an embodiment, the first target function may be a Euclidean loss function and the second target function may be a cross entropy loss function.

In an embodiment, the processor may be configured to perform face detection on an image, face registration on a detected face image, and normalization processing on the face image, to obtain the to-be-recognized face image.

For example, the computer-readable storage medium may be a read-only memory (ROM), a RAM, a compact disc read-only memory (CD-ROM), a magnetic tape, a floppy disk, an optical data storage device, and the like.

A person of ordinary skill in the art may understand that all or some of the steps of the foregoing embodiments may be completed by using hardware, or may be completed by a program instructing relevant hardware. The program may be stored in a computer readable storage medium. The above-mentioned storage medium may be a ROM, a magnetic disk, an optical disc, or the like.

The foregoing descriptions are merely example embodiments of the disclosure, but are not intended to limit the scope of the disclosure. Any modification, equivalent replacement, or improvement made within the spirit and principle of the disclosure shall fall within the protection scope of this disclosure.

What is claimed is:

1. A face attribute recognition method, performed by an electronic device, the method comprising:
    obtaining a face image;
    inputting the face image into an attribute recognition model;
    performing a forward calculation on the face image using the attribute recognition model to obtain a plurality of attribute values according to different types of attributes; and
    outputting the plurality of attribute values, the plurality of attribute values indicating recognition results of a plurality of attributes of the face image, and
    wherein the attribute recognition model is obtained through training based on a plurality of sample face images, a plurality of sample attribute recognition results of the plurality of sample face images, and the different types of attributes
    wherein the performing the forward calculation on the face image further comprises:
    extracting face features of the face image;
    performing the forward calculation on the face features according to sub-models corresponding to the different types of attributes to obtain feature values corresponding to the plurality of attributes of the face image; and
    based on an attribute among the plurality of attributes not being a regression attribute, performing a normalized calculation on each digit in a feature value corresponding to the attribute, to obtain a prediction vector corresponding to the attribute.

2. The method according to claim 1, wherein the performing the forward calculation on the face image using the attribute recognition model further comprises:
    based on the attribute being the regression attribute, using the feature value corresponding to the attribute
    wherein each digit in the prediction vector is a probability that the attribute is the recognition result indicated by the digit; and
    determining a predicted value corresponding to the recognition result having a largest probability as the attribute value.

3. The method according to claim 1, wherein the attribute recognition model being obtained through training further comprises:
    obtaining a plurality of pieces of sample face data, wherein the plurality of pieces of sample face data comprises the plurality of sample face images and attribute values corresponding to the plurality of sample face images;
    extracting face features of the sample face image;
    performing the forward calculation on the plurality of sample face images according to sub-models corresponding to different attributes in an initial model, to obtain predicted values of the plurality of attributes of the plurality of sample face images;

calculating loss values of the plurality of attributes according to the predicted values, the attribute values of the plurality of sample face images, and the different types of the attributes;

performing weighted summation on the loss values of the plurality of attributes to obtain a total loss value; and adjusting parameters of the sub-models corresponding to the different types of attributes in the initial model, and stopping the adjustment when the adjusted parameters cause the total loss value of the plurality of attributes to be less than or equal to a target threshold.

4. The method according to claim 3, wherein the calculating the loss values of the plurality of attributes further comprises:

based on a first attribute being a regression attribute, calculating a first predicted value and a first attribute value of the first attribute by using a first target function, to obtain a first loss value corresponding to the first attribute, wherein the first target function is used for calculating a loss value of a continuous variable; or based on a second attribute not being the regression attribute, calculating a first prediction vector and a first attribute vector of the second attribute by using a second target function, to obtain a second loss value corresponding to the second attribute, wherein the second target function is used for calculating a loss value of a qualitative variable.

5. The method according to claim 4, wherein the first target function is a Euclidean loss function and the second target function is a cross entropy loss function.

6. The method according to claim 1, wherein the obtaining the face image further comprises:

performing a face detection on the face image, performing face registration on the detected face image, and performing normalization processing on the face image to obtain the face image.

7. An electronic device, comprising:

at least one memory configured to store computer program code;

at least one processor configured to access the computer program code and operate as instructed the computer program code, the computer program code including:

obtaining code configured to cause the at least one processor to:

obtain a face image;

input and output code configured to cause the at least one processor to:

input the face image into an attribute recognition model;

perform a forward calculation on the face image using the attribute recognition model to obtain a plurality of attribute values according to different types of attributes, and output the plurality of attribute values of the face image, the plurality of attribute values indicating recognition results of a plurality of attributes of the face image, and wherein the attribute recognition model is obtained through training based on a plurality of sample face images, a plurality of sample attribute recognition results of the plurality of sample face images, and the different types of attributes, and wherein the computer program code further comprises:

first extraction code configured to cause the at least one processor to extract face features of the face image;

first calculation code configured to cause the at least one processor to perform the forward calculation on the face features according to sub-models corresponding to the different types of attributes to obtain feature values corresponding to the plurality of attributes of the face image; and determining code configured to cause the at least one processor to, based on an attribute among the plurality of attributes not being a regression attribute, perform a normalized calculation on each digit in a feature value corresponding to the attribute, to obtain a prediction vector corresponding to the attribute.

8. The electronic device according to claim 7, wherein the determining code is further configured to cause the at least one processor to:

based on the attribute being the regression attribute, use the feature value corresponding to the attribute, wherein each digit in the prediction vector is a probability that the attribute is the recognition result indicated by the digit; and determine a predicted value corresponding to the recognition result having a largest probability as the attribute value.

9. The electronic device according to claim 7, wherein the electronic device further comprises:

the obtaining code configured to cause the at least one processor to obtain a plurality of pieces of sample face data, wherein the plurality of pieces of sample face data comprises the plurality of sample face images and attribute values corresponding to the plurality of sample face images;

second extract code configured to cause the at least one processor to extract face features of the sample face image;

second calculation code configured to cause the at least one processor to:

perform the forward calculation on the plurality of sample face images according to sub-models corresponding to different attributes in an initial model, to obtain predicted values of the plurality of attributes of the plurality of sample face images;

calculate loss values of the plurality of attributes according to the predicted values, the attribute values of the plurality of sample face images, and the different types of the attributes;

perform weighted summation on the loss values of the plurality of attributes, to obtain a total loss value; and adjustment code configured to cause the at least one processor to adjust parameters of the sub-models corresponding to the different types of attributes in the initial model, and stop the adjustment when the adjusted parameters cause the total loss value of the plurality of attributes to be less than or equal to a target threshold.

10. The electronic device according to claim 9, wherein the second calculation code is further configured to cause the at least one processor to:

based on a first attribute being a regression attribute, calculate a first predicted value and a first attribute value of the first attribute by using a first target function, to obtain a first loss value corresponding to the first attribute, wherein the first target function is used for calculating a loss value of a continuous variable; or based on a second attribute not being the regression attribute, calculate a first prediction vector and a first attribute vector of the second attribute by using a second target function, to obtain a second loss value corresponding to the second attribute, wherein the second target function is used for calculating a loss value of a qualitative variable.

11. The electronic device according to claim 10, wherein the first target function is a Euclidean loss function and the second target function is a cross entropy loss function.

12. The electronic device according to claim 7, wherein the obtaining code is further configured to cause the at least one processor to perform a face detection on the face image, perform face registration on the detected face image, and perform normalization processing on the face image, to obtain the face image.

13. A non-transitory computer-readable storage medium, storing executable instructions, the executable instructions capable of causing a computer to:
   obtain face image;
   input the face image into an attribute recognition model;
   perform a forward calculation on the face image using the attribute recognition model to obtain a plurality of attribute values according to different types of attributes; and
   output the plurality of attribute values, the plurality of attribute values indicating recognition results of a plurality of attributes of the face image,
   wherein the attribute recognition model is obtained through training based on a plurality of sample face images, a plurality of sample attribute recognition results of the plurality of sample face images, and the different types of attributes, and
   wherein the performing the forward calculation on the face image further comprises:
   extracting face features of the face image;
   performing the forward calculation on the face features according to sub-models corresponding to the different types of attributes to obtain feature values corresponding to the plurality of attributes of the face image; and
   based on an attribute among the plurality of attributes not being a regression attribute, performing a normalized calculation on each digit in a feature value corresponding to the attribute, to obtain a prediction vector corresponding to the attribute.

14. The non-transitory computer-readable storage medium according to claim 13, wherein the executable instructions are further capable of causing the computer to:
   based on the attribute being the regression attribute, use the feature value corresponding to the attribute,
   wherein each digit in the prediction vector is a probability that the attribute is the recognition result indicated by the digit; and
   determine a predicted value corresponding to the recognition result having a largest probability as the attribute value.

15. The non-transitory computer-readable storage medium according to claim 13, wherein the executable instructions are further capable of causing the computer to:
   obtain a plurality of pieces of sample face data, wherein the plurality of pieces of sample face data comprises the plurality of sample face images and attribute values corresponding to the plurality of sample face images;
   extracting face features of the sample face image;
   performing the forward calculation the plurality of sample face images according to sub-models corresponding to different attributes in an initial model, to obtain predicted values of the plurality of attributes of the plurality of sample face images;
   calculating loss values of the plurality of attributes according to the predicted values, the attribute values of the plurality of sample face images, and the different types of attributes;
   performing weighted summation on the loss values of the plurality of attributes to obtain a total loss value; and
   adjusting parameters of the sub-models corresponding to the different types of attributes in the initial model, and stopping the adjustment when the adjusted parameters cause the total loss value of the plurality of attributes to be less than or equal to a target threshold.

16. The computer-readable storage medium according to claim 15, wherein the executable instructions are further capable of causing the computer to:
   based on a first attribute being a regression attribute, calculating a first predicted value and a first attribute value of the first attribute by using a first target function, to obtain a first loss value corresponding to the first attribute, wherein the first target function is used for calculating a loss value of a continuous variable; or
   based on a second attribute not being the regression attribute, calculating a first prediction vector and a first attribute vector of the second attribute by using a second target function, to obtain a second loss value corresponding to the second attribute, wherein the second target function is used for calculating a loss value of a qualitative variable.

17. The computer-readable storage medium according to claim 16, wherein the first target function is a Euclidean loss function and the second target function is a cross entropy loss function.

18. The computer-readable storage medium according to claim 13, wherein the executable instructions are further capable of causing the computer to:
   perform a face detection on the face image, performing face registration on the detected face image, and performing normalization processing on the face image, to obtain the face image.

19. The method according to claim 1, wherein the method further comprises:
   performing an inverse normalization processing on the plurality of attribute values; and
   displaying, on a display of the electronic device, the plurality of attributes of the face image.

20. The electronic device according to claim 7, wherein the electronic device further comprises a display; and
   wherein the input and output code is further configured to cause the at least one processor to perform an inverse normalization processing on the plurality of attribute values.

* * * * *